D. Rice,
Fruit Drier.

Nº 68,459.        Patented Sep. 3, 1867.

Witnesses:
Arthur Maxwell
John R. Briggs

Inventor:
Dennis Rice

United States Patent Office.

DENNIS RICE, OF SHELBURNE FALLS, MASSACHUSETTS.

Letters Patent No. 68,459, dated September 3, 1867.

IMPROVEMENT IN MACHINE FOR DRYING FRUIT.

The Schedule referred to in these Letters Patent and making part of the same.

TO ALL WHOM IT MAY CONCERN:

Be it known that I, DENNIS RICE, of Shelburne Falls, in the county of Franklin, and State of Massachusetts, have invented a new and useful Machine for Drying Fruits; and do hereby declare that the following is a full and exact description thereof, reference being had to the accompanying drawings, and to the letters of reference marked thereon.

The nature of my invention consists in providing a box or case having a glass door and apertures at the bottom for the introduction of fresh air, and a cupola on top, pierced with holes to allow the air and gases to pass off, and with shelves arranged inside of the box, having interstices or spaces through them to allow the passage of air, and on which to place the fruit to be dried.

To enable others to make and use my invention, I proceed to describe its construction and operation.

Figure 1:
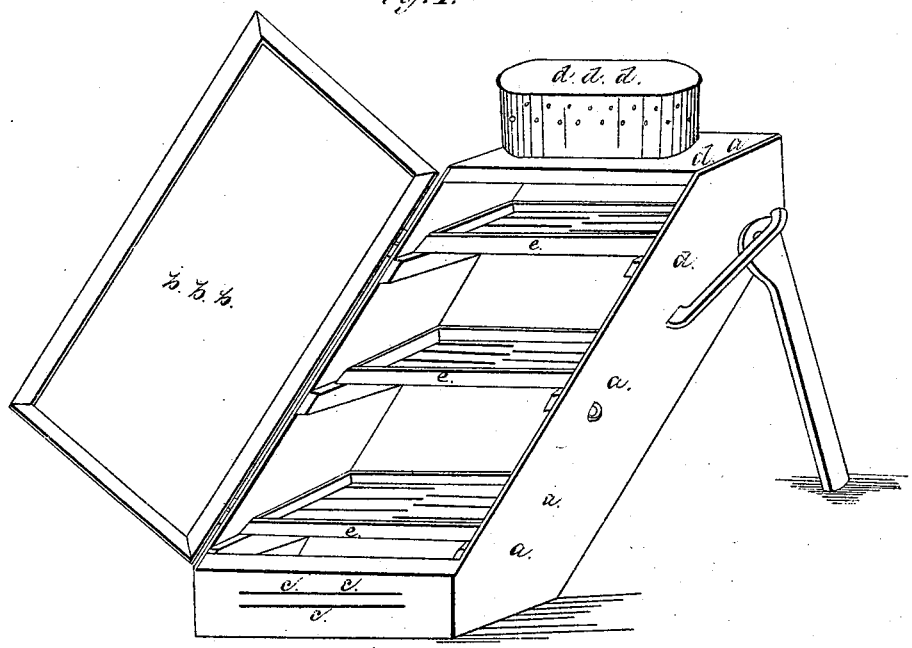
Figure 2:
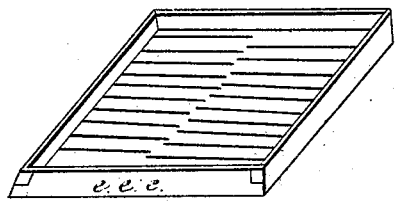

My invention consists of a box, marked $a\ a\ a$, having the glass door $b\ b\ b$, and the apertures $c\ c\ c$, and the cupola $d\ d\ d$ pierced with holes, and the shelves $e\ e\ e$, one of them being represented in Figure 2 separately from the box. Thus the air, passing through the apertures $c\ c\ c$, and arising through and over the shelves $e\ e\ e$, and passing out through the holes of the cupola $d\ d\ d$, in connection with the rays of the sun, passing through the glass door $b\ b\ b$, dries the fruit more rapidly than the open air, and preserves it clean, free from the impurities of insects and of the open air, and with much less loss of substance.

What I claim as my invention, and desire to secure by Letters Patent, is—

The combination and arrangement of the box $a\ a\ a$ with the glass door $b\ b\ b$, and the apertures $c\ c\ c$, and the cupola $d\ d\ d$, and the shelves $e\ e\ e$, substantially as and for the purposes described.

DENNIS RICE.

Witnesses:
ARTHUR MAXWELL,
JOHN P. BRIGGS.